United States Patent
Iida

(10) Patent No.: US 11,745,352 B2
(45) Date of Patent: Sep. 5, 2023

(54) VISION SENSOR SYSTEM, CONTROL METHOD, AND NON-TRANSITORY COMPUTER READABLE STORAGE MEDIUM

(71) Applicant: OMRON Corporation, Kyoto (JP)

(72) Inventor: Toyoo Iida, Nagaokakyo (JP)

(73) Assignee: OMRON Corporation, Kyoto (JP)

( * ) Notice: Subject to any disclaimer, the term of this patent is extended or adjusted under 35 U.S.C. 154(b) by 513 days.

(21) Appl. No.: 17/042,934

(22) PCT Filed: May 9, 2019

(86) PCT No.: PCT/JP2019/018547
§ 371 (c)(1),
(2) Date: Sep. 29, 2020

(87) PCT Pub. No.: WO2019/230320
PCT Pub. Date: Dec. 5, 2019

(65) Prior Publication Data
US 2021/0016448 A1 Jan. 21, 2021

(30) Foreign Application Priority Data
May 29, 2018 (JP) ................................. 2018-102264

(51) Int. Cl.
*B25J 9/16* (2006.01)
*B25J 13/08* (2006.01)
*B25J 19/02* (2006.01)

(52) U.S. Cl.
CPC ........... *B25J 9/1697* (2013.01); *B25J 13/089* (2013.01); *B25J 19/023* (2013.01)

(58) Field of Classification Search
CPC ....... B25J 9/1697; B25J 13/089; B25J 19/023
See application file for complete search history.

(56) References Cited

U.S. PATENT DOCUMENTS

| | | | |
|---|---|---|---|
| 2007/0090189 A1* | 4/2007 | Suwa | G01B 11/2522 235/454 |
| 2013/0011018 A1* | 1/2013 | Tateno | G01B 11/002 901/14 |

(Continued)

FOREIGN PATENT DOCUMENTS

| | | |
|---|---|---|
| CN | 102914293 | 2/2013 |
| JP | 2007114071 | 5/2007 |

(Continued)

OTHER PUBLICATIONS

"Office Action of China Counterpart Application" with English translation thereof, dated Nov. 2, 2021, p. 1-p. 21.

(Continued)

*Primary Examiner* — Kira Nguyen
(74) *Attorney, Agent, or Firm* — JCIPRNET

(57) ABSTRACT

On the basis of a measured shape, which is a three-dimensional shape of a subject measured by means of a measuring unit using an image captured when an image capturing unit is disposed in a first position and a first attitude, a movement control unit determines a second position and a second attitude for capturing an image of the subject again, and sends an instruction to a movement mechanism. The three-dimensional shape is represented by means of height information from a reference surface. The movement control unit extracts, from the measured shape, a deficient region having deficient height information, and determines the second position and the second attitude on the basis of the height information around the deficient region of the measured shape. The position and attitude of the image capturing unit can be determined in such a way as to make it easy to eliminate the effects of shadows.

19 Claims, 10 Drawing Sheets

(56) References Cited

U.S. PATENT DOCUMENTS

2017/0326739 A1* 11/2017 Nakazato ............... B25J 13/081
2018/0372484 A1* 12/2018 Fujita ................. G01B 11/2513

FOREIGN PATENT DOCUMENTS

| JP | 2008082707 | 4/2008 |
| JP | 2012079294 | 4/2012 |
| JP | 2012225888 | 11/2012 |
| JP | 2016099257 | 5/2016 |
| JP | 2017053793 | 3/2017 |
| WO | 2017163537 | 9/2017 |

OTHER PUBLICATIONS

"International Search Report (Form PCT/ISA/210) of PCT/JP2019/018547", dated Aug. 6, 2019, with English translation thereof, pp. 1-4.

"Written Opinion of the International Searching Authourity (Form/ISA/237) of PCT/JP2019/018547", dated Aug. 6, 2019, with English translation thereof, p. 1-p. 14.

* cited by examiner

VISION SENSOR SYSTEM, CONTROL METHOD, AND NON-TRANSITORY COMPUTER READABLE STORAGE MEDIUM

CROSS-REFERENCE TO RELATED APPLICATION

This application is a 371 application of the international PCT application serial no. PCT/JP2019/018547, filed on May 9, 2019, which claims the priority benefit of Japan application no. 2018-102264, filed on May 29, 2018. The entirety of each of the above-mentioned patent applications is hereby incorporated by reference herein and made a part of this specification.

TECHNICAL FIELD

The present invention relates to a vision sensor system, a control method, and a program.

BACKGROUND ART

In recent years, techniques of capturing an image of a subject onto which pattern light is projected from a projector with a camera and measuring the three-dimensional shape of the surface of the subject using an obtained image have been developed.

Japanese Patent Laid-Open No. 2016-99257 (Patent Literature 1) discloses a technique in which a three-dimensional shape is measured multiple times in consideration of the effects of shadows which are generated due to illumination or the like. Specifically, first image capturing is performed when a camera is disposed in a first position and attitude, and then the camera is disposed in a second position and attitude rotated by a predetermined angle within a plane including the optical axis of a projector and the optical axis of the camera around a target object.

CITATION LIST

Patent Literature

Patent Literature 1:
  Japanese Patent Laid-Open No. 2016-99257
Patent Literature 2:
  Japanese Patent Laid-Open No. 2007-114071
Patent Literature 3:
  Japanese Patent Laid-Open No. 2012-79294

SUMMARY OF INVENTION

Technical Problem

In the technique disclosed in Japanese Patent Laid-Open No. 2016-99257, a position and attitude rotated by a predetermined angle from the first position and attitude are determined as the second position and attitude. That is, the amount of movement from the first position and attitude of the camera to the second position and attitude thereof is constant. However, the situation of shadows changes depending on the state of a subject. For this reason, the second position and attitude are not necessarily a position and attitude that make it easy to eliminate the effects of shadows.

The present disclosure was contrived in view of the above problem, and an objective thereof is to provide a vision sensor system, a control method, and a program that make it possible to determine the position and attitude of an image capturing unit in such a way as to make it easy to eliminate the effects of shadows.

Solution to Problem

In an example of the present disclosure, a vision sensor system includes an image capturing unit, a movement mechanism, a measuring unit, and a movement control unit. The image capturing unit captures an image of a subject. The movement mechanism disposes the image capturing unit in an instructed position with an instructed attitude. The measuring unit measures a three-dimensional shape of a surface of the subject using an image captured by the image capturing unit. The movement control unit determines a second position and a second attitude for capturing an image of the subject again on the basis of a measured shape which is a three-dimensional shape of the subject measured by means of the measuring unit using an image captured when the image capturing unit is disposed in a first position and a first attitude, and sends an instruction to the movement mechanism. The three-dimensional shape is represented by means of height information from a reference surface. The movement control unit extracts a deficient region which is deficient in the height information from the measured shape, and determines the second position and the second attitude on the basis of the height information around the deficient region in the measured shape.

The height information around the deficient region has a high possibility of being associated with the three-dimensional shape of the subject within the deficient region. Therefore, according to this disclosure, it is possible to determine the second position and the second attitude that make it easy to acquire the height information within the deficient region by using the height information around the deficient region. That is, it is possible to determine the position and attitude of the image capturing unit in such a way as to make it easy to eliminate the effects of shadows.

In an example of the present disclosure, the movement control unit determines the second position and the second attitude so that height information of a target segment that links two points around the deficient region in the measured shape is able to be acquired.

According to this disclosure, the image capturing unit is disposed in the second position and the second attitude that make it possible to acquire the height information of the target segment, so that there is an increasing possibility of the height information within the deficient region being able to be acquired.

In an example of the present disclosure, the movement control unit obtains a first angle between the target segment and a first plane perpendicular to an optical axis of the image capturing unit disposed in the first position and the first attitude. Further, the movement control unit determines a difference between the first angle and a second angle which is determined in advance in accordance with characteristics of the image capturing unit and the subject as an angle of movement from the first attitude to the second attitude. Further, the movement control unit determines an attitude, rotated by the angle of movement from the first attitude along a second plane including the target segment and perpendicular to the reference surface in a direction in which an angle between the target segment and the optical axis of the image capturing unit approaches 90 degrees, as the second attitude.

According to this disclosure, it is possible to suppress the amount of rotational movement from the first attitude to the second attitude that makes it possible to acquire the height information of the target segment. It is possible to shorten a time required for the movement of the image capturing unit by suppressing the amount of rotational movement.

In an example of the present disclosure, a segment obtained by projecting the target segment onto the reference surface is parallel to a direction determined in advance. According to this disclosure, the movement control unit has a tendency to determine the target segment.

In an example of the present disclosure, in the measured shape, one of the two points is a point at which the height information is maximum around the deficient region. The other of the two points is a point at which the height information is minimum around the deficient region.

According to this disclosure, the movement control unit can determine a target segment having a largest first angle with respect to the first plane perpendicular to the optical axis of the image capturing unit disposed in the first position and the first attitude. As a result, the image capturing unit is disposed in the second position and the second attitude, so that there is an increasing possibility of the Z coordinate value of the deficient region being able to be calculated.

In an example of the present disclosure, the movement control unit determines the second position and the second attitude so that height information of a target region overlapping the deficient region in an approximate plane approximating at least three points around the deficient region in the measured shape is able to be acquired.

According to this disclosure, the image capturing unit is disposed in the second position and the second attitude that make it possible to acquire the height information of the target region, so that there is an increasing possibility of the height information within the deficient region being able to be acquired.

In an example of the present disclosure, the movement control unit obtains a first angle between the target region and a first plane perpendicular to an optical axis of the image capturing unit disposed in the first position and the first attitude. The movement control unit determines a difference between the first angle and a second angle which is determined in advance in accordance with characteristics of the image capturing unit and the subject as an angle of movement from the first attitude to the second attitude. The movement control unit determines an attitude, rotated by the angle of movement from the first attitude along a second plane including a normal line of the target region and perpendicular to the reference surface in a direction in which an angle between the target region and the optical axis of the image capturing unit approaches 90 degrees, as the second attitude.

According to this disclosure, it is possible to suppress the amount of rotational movement from the first attitude to the second attitude that makes it possible to acquire the height information of the target region. It is possible to shorten a time required for the movement of the image capturing unit by suppressing the amount of rotational movement.

In an example of the present disclosure, the movement control unit determines the second position so that an optical axis of the image capturing unit passes through a reference point which is a point having the larger height information out of the two points. Alternatively, the movement control unit may determine the second position so that an optical axis of the image capturing unit passes through a reference point which is a point having the smaller height information out of the two points. Alternatively, the movement control unit may determine the second position so that an optical axis of the image capturing unit passes through a reference point which is a midpoint between the two points. Alternatively, the movement control unit may determine the second position so that an optical axis of the image capturing unit passes through a reference point within the target region. According to these disclosures, it is possible to determine the second position that makes it easy to acquire the height information within the deficient region.

In an example of the present disclosure, the movement control unit determines the second position so that a distance between the reference point and the first position and a distance between the reference point and the second position become equal to each other. According to this disclosure, it is possible to match the accuracy of measurement of height information around a deficient region measured from an image captured when the image capturing unit is disposed in the first position and the first attitude with the accuracy of measurement of the height information within the deficient region measured from an image captured when the image capturing unit is disposed in the second position and the second attitude.

In an example of the present disclosure, a vision sensor system includes an image capturing unit that captures an image of a subject, a movement mechanism that disposes the image capturing unit in an instructed position and an instructed attitude, and a measuring unit that measures a three-dimensional shape of a surface of the subject using an image captured by the image capturing unit. The three-dimensional shape is represented by means of height information from a reference surface. A method of controlling the vision sensor system includes a first step and a second step. The first step is a step of extracting a deficient region which is deficient in the height information from a measured shape which is a three-dimensional shape of the subject measured by means of the measuring unit using an image captured when the image capturing unit is disposed in a first position and a first attitude. The second step is a step of determining a second position and a second attitude for capturing an image of the subject again on the basis of the height information around the deficient region in the measured shape. According to this disclosure, it is possible to determine the position and attitude of the image capturing unit in such a way as to make it easy to eliminate the effects of shadows.

In an example of the present disclosure, a program for supporting a vision sensor system causes a computer to execute the first step and the second step. With this disclosure, it is also possible to determine the position and attitude of the image capturing unit in such a way as to make it easy to eliminate the effects of shadows.

Advantageous Effects of Invention

According to the present disclosure, it is possible to determine the position and attitude of the image capturing unit in such a way as to make it easy to eliminate the effects of shadows.

DESCRIPTION OF EMBODIMENTS

Figure 1:
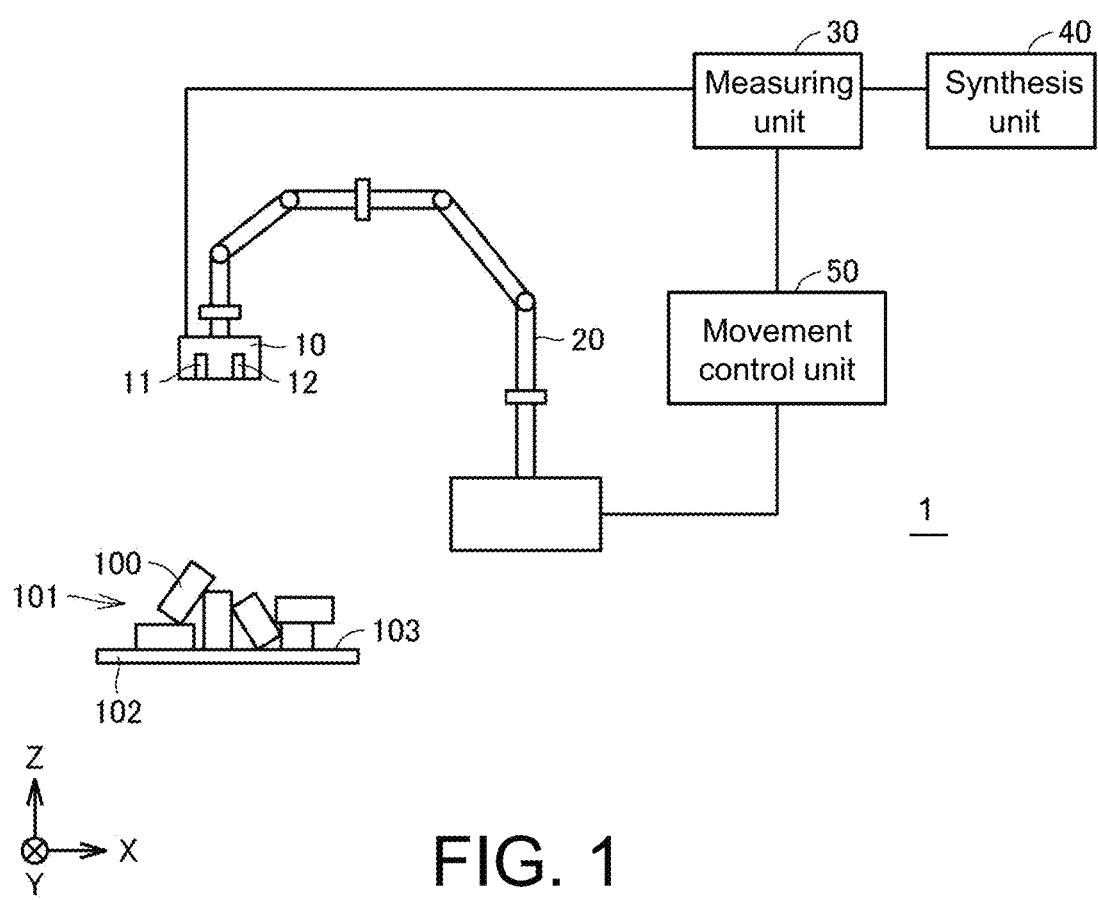
FIG. 1 is a schematic diagram illustrating an overall configuration of a vision sensor system according to an embodiment.

An embodiment of the present disclosure will be described in detail with reference to the accompanying drawings. Meanwhile, the same or equivalent portions in the drawings are denoted by the same reference numerals and signs, and thus description thereof will not be repeated.

1 Application Example

An example of a situation to which the present invention is applied will be described with reference to FIG. 1. FIG. 1 is a schematic diagram illustrating an overall configuration of a vision sensor system according to an embodiment. In a vision sensor system 1, for example, the whole of a plurality of objects 100 stacked on a pallet 102 installed in a predetermined position is defined as a subject 101, and the three-dimensional shape of the surface of the subject 101 is measured. The three-dimensional shape measured by means of the vision sensor system 1 is used in various applications. For example, a grasping robot which is not shown in the drawing selects an object 100 located in the highest position from among the plurality of objects 100 on the basis of the three-dimensional shape measured by means of the vision sensor system 1, grasps the selected object 100, and transports it to another place.

As shown in FIG. 1, the vision sensor system 1 includes an acquisition unit 10, a robot 20, a measuring unit 30, a synthesis unit 40, and a movement control unit 50.

The acquisition unit 10 acquires an image for measuring the three-dimensional shape of the surface of the subject 101. The acquisition unit 10 is a unit in which a projector 11 that projects pattern light onto the subject 101 and a camera 12 that captures an image of the subject 101 onto which the pattern light is projected are integrated with each other. The pattern light is, for example, a stripe pattern.

The robot 20 is a movement mechanism that moves the acquisition unit 10, and is, for example, a vertical articulated robot. The acquisition unit 10 is fixed to the tip of the robot 20. The robot 20 moves the acquisition unit 10 so that the camera 12 is disposed in an instructed position with an instructed attitude.

The measuring unit 30 is an image processing device that processes an image captured by the camera 12 to thereby measure the three-dimensional shape of the surface of the subject 101 and generate three-dimensional shape data representing the measured three-dimensional shape.

The three-dimensional shape is represented by, for example, an XYZ coordinate system in which a reference surface 103 that is the upper surface of the pallet 102 is defined as an XY plane and a Z-axis is defined as an axis perpendicular to the XY plane. A Z coordinate value is information of height from the reference surface 103 to the surface of the subject 101. The three-dimensional shape data includes XYZ coordinate values of each point of the measured three-dimensional shape. Meanwhile, calibration in which the coordinate system of the camera 12 and the coordinate system of the robot 20 are associated with each other is performed in advance. The measuring unit 30 can calculate XYZ coordinate values of an absolute coordinate system from values of the coordinate system of the camera 12 on the basis of calibration data and the position and attitude of the robot 20.

Figure 2:
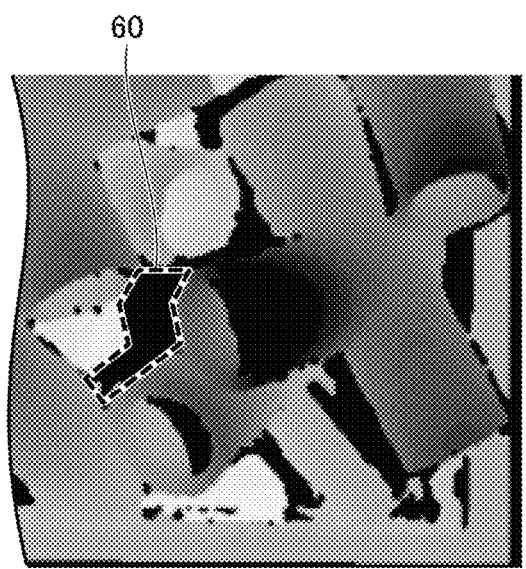
FIG. 2 is a diagram illustrating an example of a distance image converted from three-dimensional shape data.

FIG. 2 is a diagram illustrating an example of a distance image converted from the three-dimensional shape measured by means of the measuring unit 30. The distance image is obtained by converting the Z coordinate value (height information) of the three-dimensional shape data into a luminance value. In FIG. 2, higher luminance indicates a larger Z coordinate value.

In FIG. 2, a deficient region 60 is a region which is deficient in the Z coordinate value in the three-dimensional shape data, and is indicated by minimum luminance. Pattern light is not sufficiently projected from the projector 11 onto a shadow portion of the subject 101. The measuring unit 30 cannot measure the Z coordinate value of a portion onto which the pattern light is not sufficiently projected. That is, the deficient region 60 corresponds to a shadow region onto which the pattern light has not been sufficiently projected.

Referring back to FIG. 1, the synthesis unit 40 synthesizes a three-dimensional shape measured using an image captured when the camera 12 is disposed in a first position and a first attitude (hereinafter referred to as a "first measured shape") and a three-dimensional shape measured using an image captured when the camera 12 is disposed in a second position and a second attitude (hereinafter referred to as a "second measured shape"). Specifically, the synthesis unit 40 replaces the Z coordinate value of a portion corresponding to the deficient region 60 (see FIG. 2) in three-dimensional shape data representing the first measured shape by the Z coordinate value of the same region in three-dimensional shape data representing the second measured shape.

The movement control unit 50 controls the movement of the acquisition unit 10 by sending an instruction for the position and attitude of the camera 12 to the robot 20.

In a case where a deficient region is included in the first measured shape, the movement control unit 50 determines the second position and the second attitude of the camera 12 for capturing an image of the subject 101 again. The movement control unit 50 sends an instruction for the determined second position and second attitude to the robot 20.

The movement control unit 50 varies the amount of movement from the first position and the first attitude to the second position and the second attitude in accordance with the first measured shape. Specifically, the movement control unit 50 extracts the deficient region 60 (see FIG. 2) from the first measured shape, and determines the second position and the second attitude on the basis of Z coordinate values around the deficient region 60 in the first measured shape. The Z coordinate values around the deficient region 60 have a high possibility of being associated with the three-dimensional shape of the subject 101 within the deficient region 60. Therefore, it is possible to determine the second position and the second attitude that make it easy to acquire Z coordinate values within the deficient region 60 by using the Z coordinate values around the deficient region 60.

The movement control unit 50 determines the second position and the second attitude, for example, so that the Z coordinate values of a target segment that links two points around the deficient region 60 in the first measured shape are able to be acquired.

Figure 3:
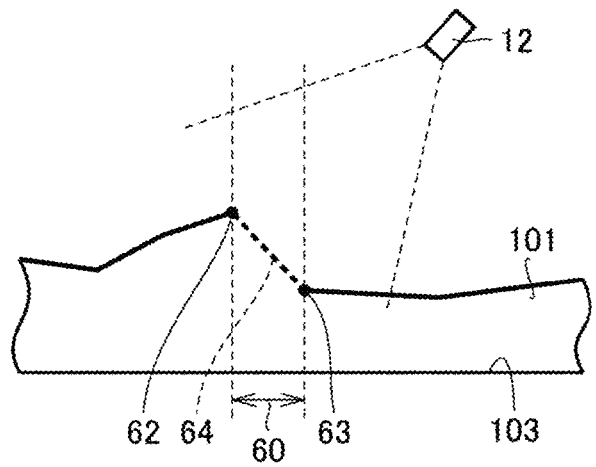
FIG. 3 is a diagram illustrating a deficient region and a height profile of its vicinity.

FIG. 3 is a diagram illustrating a deficient region and a height profile of its vicinity. In FIG. 3, points 62 and 63 are two points around the deficient region 60 which is deficient in Z coordinate values indicating height information with respect to the reference surface 103. The three-dimensional shape of the subject 101 within the deficient region 60 is unknown, but the camera 12 is disposed in the second position and the second attitude that make it possible to acquire the Z coordinate value of a target segment 64 that links the point 62 and the point 63, so that there is an increasing possibility of the Z coordinate values within the deficient region 60 being able to be acquired.

2 Specific Example

Next, an example of each configuration of the vision sensor system according to the present embodiment will be described.

A. Measuring Unit

The measuring unit 30 includes a central processing unit (CPU), a random access memory (RAM), a read only memory (ROM), an auxiliary storage device, a communication I/F, and the like, and performs image processing. The auxiliary storage device is constituted by, for example, a hard disk drive, a solid-state drive or the like, and stores a program which is executed by the CPU or the like.

The measuring unit 30 processes an image captured by the camera 12, measures the three-dimensional shape of the surface of the subject 101 facing the camera 12 side, and generates three-dimensional shape data representing the measured three-dimensional shape. Specifically, the measuring unit 30 calculates XYZ coordinate values of each point on the surface of the subject 101. The measuring unit 30 calculates the three-dimensional shape data of the subject 101 by converting the coordinate system of the camera 12 into the XYZ coordinate system of the robot 20 using position and attitude information indicating the position and attitude of the camera 12. As described above, the XYZ coordinate system is the coordinate system of the robot 20 in which the XY plane coincides with the reference surface 103 that is the upper surface of the pallet 102, and the Z-axis is set to be orthogonal to the XY plane. The measuring unit 30 may calculate Z coordinate values using a known method such as, for example, a phase shift method (for example, Japanese Patent Laid-Open No. 2007-114071 (Patent Literature 2)). Alternatively, the measuring unit 30 may calculate Z coordinate values using a known method of a structured illumination type (for example, Japanese Patent Laid-Open No. 2012-79294 (Patent Literature 3)).

The measuring unit 30 does not calculate Z coordinate values with respect to a region in which pattern light projected from the projector 11 cannot be recognized.

B. Hardware Configuration of Movement Control Unit

Figure 4:
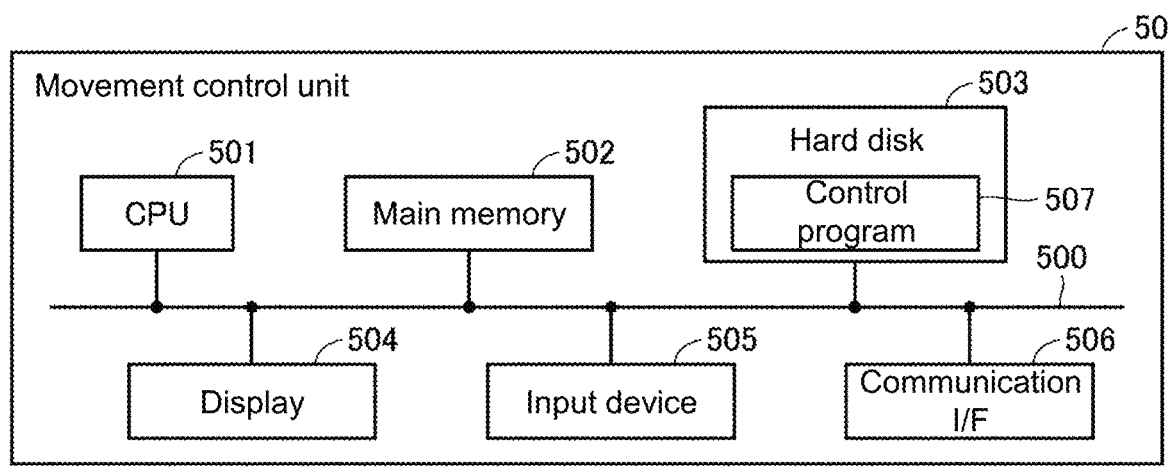
FIG. 4 is a schematic diagram illustrating a hardware configuration of a movement control unit shown in FIG. 1.

FIG. 4 is a schematic diagram illustrating a hardware configuration of the movement control unit. The movement control unit 50 includes a central processing unit (CPU) 501, a main memory 502, a hard disk 503, a display 504, an input device 505 and a communication interface (I/F) 506. These units are connected to each other through a bus 500 so as to be capable of mutual data communication.

The CPU 501 performs various types of calculation by developing programs (codes) including a control program 507 installed on the hard disk 503 into the main memory 502, and executing the developed programs in a predetermined order. The main memory 502 is typically a volatile storage device such as a dynamic random access memory (DRAM).

The hard disk 503 is an internal memory included in the movement control unit 50, and is a non-volatile storage device. The hard disk 503 stores various programs such as the control program 507. Meanwhile, a semiconductor storage device such as a flash memory may be adopted in addition to the hard disk 503 or instead of the hard disk 503.

The control program 507 is a program representing a procedure for controlling the robot 20. Various programs such as the control program 507 are not required to be stored in the hard disk 503, and may be stored in a server capable of communicating with the movement control unit 50 or an external memory capable of being directly connected to the movement control unit 50. For example, various programs executed by the movement control unit 50 and various parameters used in various programs are circulated in a state where they are stored in an external memory, and the movement control unit 50 reads out various programs and various parameters from this external memory. The external memory is a medium that stores information of recorded programs or the like through electrical, magnetic, optical, mechanical or chemical action so that a computer, other devices, machines, and the like can read information of the programs or the like. Alternatively, programs or parameters downloaded from a server or the like which is communicably connected to the movement control unit 50 may be installed in the movement control unit 50.

The display 504 is, for example, a liquid crystal display. The input device 505 is constituted by, for example, a mouse, a keyboard, a touch pad, or the like.

The communication I/F 506 exchanges various types of data between an external device and the CPU 501. Meanwhile, the communication I/F 506 may exchange data between a server and the CPU 501. The communication I/F 506 includes hardware corresponding to a network for exchanging various types of data with an external device.

Meanwhile, the control program 507 according to the present embodiment may be provided in incorporation with a portion of another program. In addition, alternatively, a dedicated hardware circuit may perform some or all of processes provided by the execution of the control program 507.

C. Internal Configuration of Movement Control Unit

Figure 5:
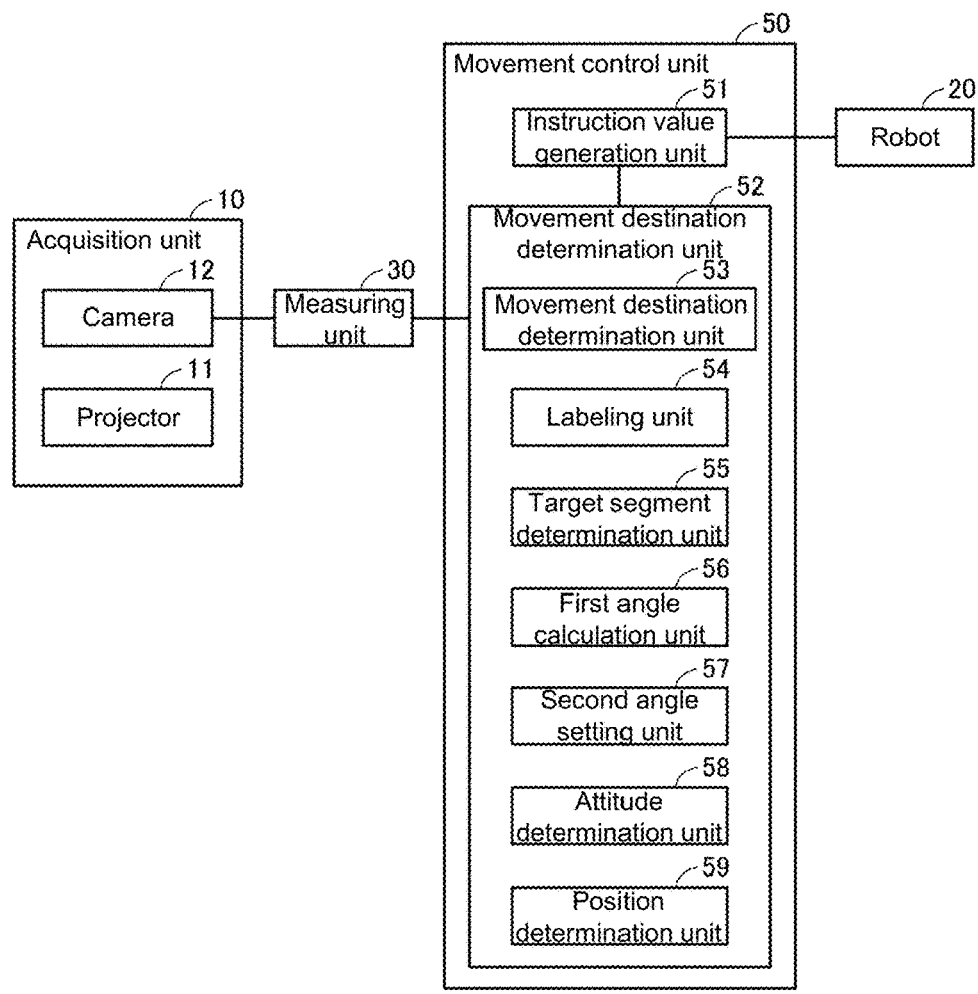
FIG. 5 is a block diagram illustrating an example of an internal configuration of the movement control unit shown in FIG. 1.

FIG. 5 is a block diagram illustrating an example of an internal configuration of the movement control unit. The movement control unit 50 of an example shown in FIG. 5 includes an instruction value generation unit 51 and a movement destination determination unit 52.

The instruction value generation unit 51 generates instruction values of the position and attitude of the camera 12, and outputs the generated instruction value to the robot 20. The instruction values include XYZ coordinate values of the camera 12 and XYZ components of a unit vector in the imaging direction of the camera 12. Further, the instruction value generation unit 51 outputs the generated instruction values, as position and attitude information of the camera 12, to the measuring unit 30.

The instruction value generation unit 51 first generates a first instruction value corresponding to the first position and the first attitude, and outputs the generated first instruction value to the robot 20. The first position and the first attitude are determined in advance. The first position is, for example, a position located a predetermined distance above the central point of the pallet 102 (see FIG. 1). The first attitude is, for example, an attitude in which the imaging direction of the camera 12 is downward in a vertical direction.

After the first instruction value is generated, the instruction value generation unit 51 generates a second instruction value corresponding to the second position and the second attitude determined by means of the movement destination determination unit 52, and outputs the generated second instruction value to the robot 20.

The movement destination determination unit 52 determines the second position and the second attitude for capturing an image of the subject 101 again on the basis of the three-dimensional shape of the surface of the subject 101 measured using an image captured when the camera 12 is disposed in the first position and the first attitude (the first measured shape).

The movement destination determination unit 52 includes a distance image generation unit 53, a labeling unit 54, a target segment determination unit 55, a first angle calculation unit 56, a second angle setting unit 57, an attitude determination unit 58, and a position determination unit 59.

The distance image generation unit 53 generates distance image data from three-dimensional shape data representing the first measured shape measured by means of the measuring unit 30. The distance image generation unit 53 generates the distance image data by converting the Z coordinate value of the three-dimensional shape data representing the first measured shape into a luminance value. Meanwhile, the distance image generation unit 53 sets luminance of a region in which the Z coordinate value is not calculated by the measuring unit 30 to have a minimum value.

The labeling unit 54 performs a labeling process on the distance image data generated by the distance image generation unit 53, to thereby extract the deficient region 60 (see FIG. 2) in which pixels having minimum luminance are continuous in a vertical, horizontal or oblique direction.

The target segment determination unit 55 determines the target segment 64 (see FIG. 3) that links two points around the deficient region 60 in the first measured shape.

In a case where a plurality of deficient regions 60 is extracted by the labeling unit 54, the target segment determination unit 55 selects one deficient region 60 from the plurality of deficient regions 60, and determines the target segment 64 only with respect to the selected deficient region 60. An algorithm for selecting one deficient region 60 from the plurality of deficient regions 60 is determined in advance in accordance with a method of using a three-dimensional shape measured by means of the vision sensor system 1. For example, in a case where a three-dimensional shape is used in order to select an object 100 located in the highest position from among the plurality of objects 100, the target segment determination unit 55 may select a deficient region 60 having the largest surrounding height from among the plurality of deficient regions 60.

Figure 6:
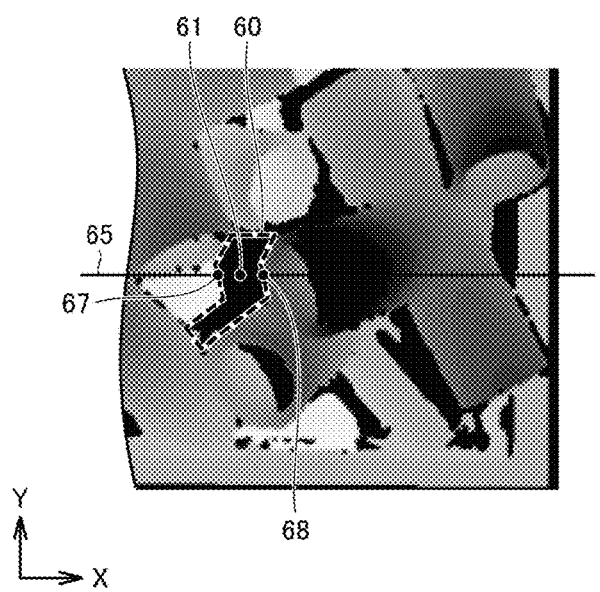
FIG. 6 is a diagram illustrating an example of a reference line which is set in the distance image.
Figure 7:
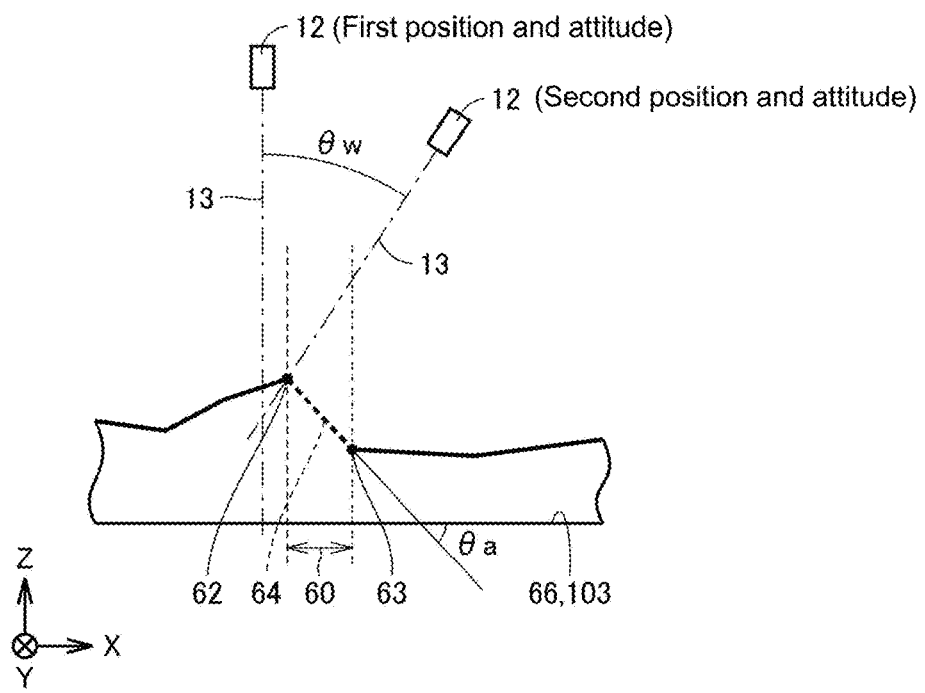
FIG. 7 is a diagram illustrating a height profile of the reference line shown in FIG. 6.

A method of determining the target segment 64 which is performed by the target segment determination unit 55 will be described with reference to FIGS. 6 and 7. FIG. 6 is a diagram illustrating an example of a reference line which is set in a distance image. FIG. 7 is a diagram illustrating a height profile of the reference line shown in FIG. 6.

As shown in FIG. 6, the target segment determination unit 55 determines a straight line that passes through a centroid 61 of the deficient region 60 and is parallel to an X-axis direction, as a reference line 65, in a distance image indicated by distance image data. The target segment determination unit 55 selects two points 67 and 68 adjacent to the deficient region 60 from points on the reference line 65. The points 67 and 68 are points around the deficient region 60 in the distance image.

As shown in FIG. 7, the target segment determination unit 55 specifies the points 62 and 63 of the XYZ coordinate system corresponding to the points 67 and 68 by inversely converting the luminance value into the Z coordinate value. The target segment determination unit 55 determines a segment that links the points 62 and 63 as the target segment 64. Since the reference line 65 is parallel to the X-axis direction, a segment obtained by projecting the target segment 64 onto the reference surface 103 is parallel to the X-axis direction.

As shown in FIG. 7, the first angle calculation unit 56 calculates an angle between the target segment 64 determined by means of the target segment determination unit 55 and a first plane 66 perpendicular to an optical axis 13 of the camera 12 disposed in the first position and the first attitude (hereinafter referred to as a "first angle") θa. As described above, the first attitude is an attitude in which the imaging direction of the camera 12 is downward in a vertical direction. Therefore, the first plane 66 perpendicular to the optical axis 13 of the camera 12 disposed in the first position and the first attitude is parallel to the XY plane. In the example shown in FIG. 7, the reference surface 103 which is the XY plane and the first plane 66 coincide with each other.

Referring back to FIG. 5, the second angle setting unit 57 sets an upper limit of an angle between the surface of the subject 101 of which the Z coordinate value can be calculated by the measuring unit 30 and a plane perpendicular to the optical axis of the camera 12 (hereinafter referred to as a "second angle θb").

Figure 8:
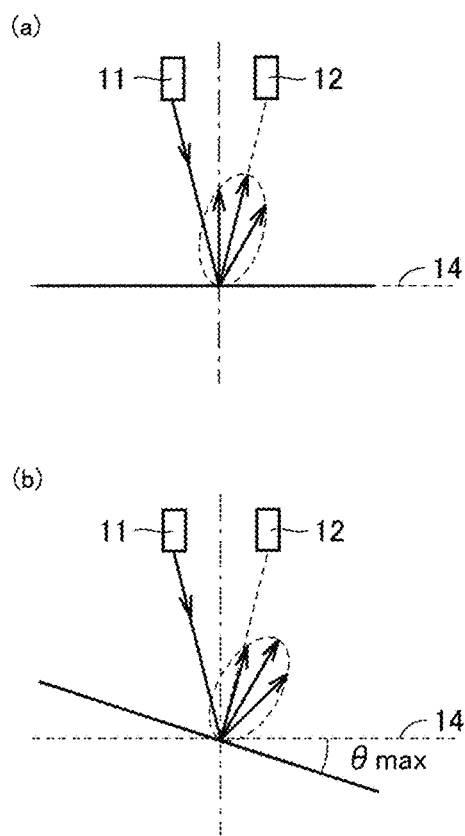
FIG. 8 is a diagram illustrating an example of a path of pattern light radiated from a projector.

FIG. 8 is a diagram illustrating an example of a path of pattern light radiated from the projector 11. (a) of FIG. 8 shows a path of the pattern light when the surface of the subject 101 is parallel to a plane 14 perpendicular to the optical axis of the camera 12. (b) of FIG. 8 shows a path of the pattern light when the surface of the subject 101 is inclined at an angle θmax with respect to the plane 14 perpendicular to the optical axis of the camera 12. As shown in FIG. 8, the incident light from the projector 11 diffuses and reflects with intensity distribution in the direction of its emission on the surface of the subject 101. Therefore, as the surface of the subject 101 inclines, reflected light that can be received by the camera 12 decreases. In a case where the angle between the surface of the subject 101 and the plane 14 perpendicular to the optical axis 13 of the camera 12 is equal to or less than the angle θmax, a predetermined S/N ratio can be maintained. On the other hand, in a case where the angle between the surface of the subject 101 and the plane 14 perpendicular to the optical axis 13 of the camera 12 exceeds the angle θmax, the measuring unit 30 cannot calculate the Z coordinate value (height information) of the surface of the subject 101 with a good degree of accuracy.

Consequently, the second angle setting unit 57 sets the angle θmax as the second angle θb.

The angle θmax differs depending on the characteristics (for example, the angle of view) of the camera 12. Further, the angle θmax also differs depending on the material of the subject 101. This is because the reflection properties and scattering properties of the pattern light differ depending on the material of the subject 101. Therefore, the second angle setting unit 57 stores a table in which the characteristics of the camera 12 and the material of the subject 101 and the angle θmax are associated with each other in advance, and sets the second angle θb in accordance with the input characteristics of the camera 12 and the material of the subject 101.

The attitude determination unit 58 determines the second attitude of the camera 12 so that the Z coordinate value of the target segment 64 (see FIG. 7) can be calculated. In order to acquire the Z coordinate value of the target segment 64, it is preferable that the angle between the plane perpendicular to the optical axis 13 of the camera 12 and the target segment 64 is equal to or less than the second angle θb. Therefore, the attitude determination unit 58 determines θw satisfying the following Expression (1) as an angle of movement θw from the first attitude to the second attitude.

$$0 \le \theta a - \theta w \le \theta b \qquad \text{Expression (1)}$$

For example, the attitude determination unit 58 determines a difference (θa−θb) between the first angle θa and the second angle θb as the angle of movement θw. Thereby, it is possible to minimize the amount of rotational movement from the first attitude to the second attitude.

The attitude determination unit 58 determines an attitude, obtained by rotationally moving the first attitude along a second plane including the target segment 64 and perpendicular to the reference surface 103 (that is, the XY plane) (that is, the plane of paper of FIG. 7 and a plane parallel to the XZ plane), as the second attitude. Specifically, the attitude determination unit 58 determines an attitude, rotated by the angle of movement θw from the first attitude along the second plane in a direction in which an angle between the target segment 64 (see FIG. 7) and the optical axis 13 of the camera 12 approaches 90 degrees, as the second attitude.

The position determination unit 59 determines the second position of the camera 12 so that the Z coordinate value of the target segment 64 (see FIG. 7) can be calculated. Specifically, the position determination unit 59 determines the position of the camera 12 satisfying the following conditions a and b as the second position.

Condition a: In the second attitude determined by means of the attitude determination unit 58, the optical axis of the camera 12 passes through a point having the larger Z coordinate value (that is, a point having the larger height information) out of the two points 62 and 63 on both ends of the target segment 64 (see FIG. 7).

Condition b: A distance from a point having the larger Z coordinate value (that is, a point having the larger height information) (reference point) out of the two points 62 and 63 on both ends of the target segment 64 (see FIG. 7) to the first position and a distance from the point to the second position are equal to each other.

As stated above, the second position and the second attitude are determined so that the Z coordinate value of the target segment 64 can be calculated. The camera 12 is disposed in the second position and the second attitude that make it possible to calculate the Z coordinate value of the target segment 64, so that there is an increasing possibility of the Z coordinate values within the deficient region 60 being able to be calculated.

D. Flow of Processes of Vision Sensor System

Figure 9:
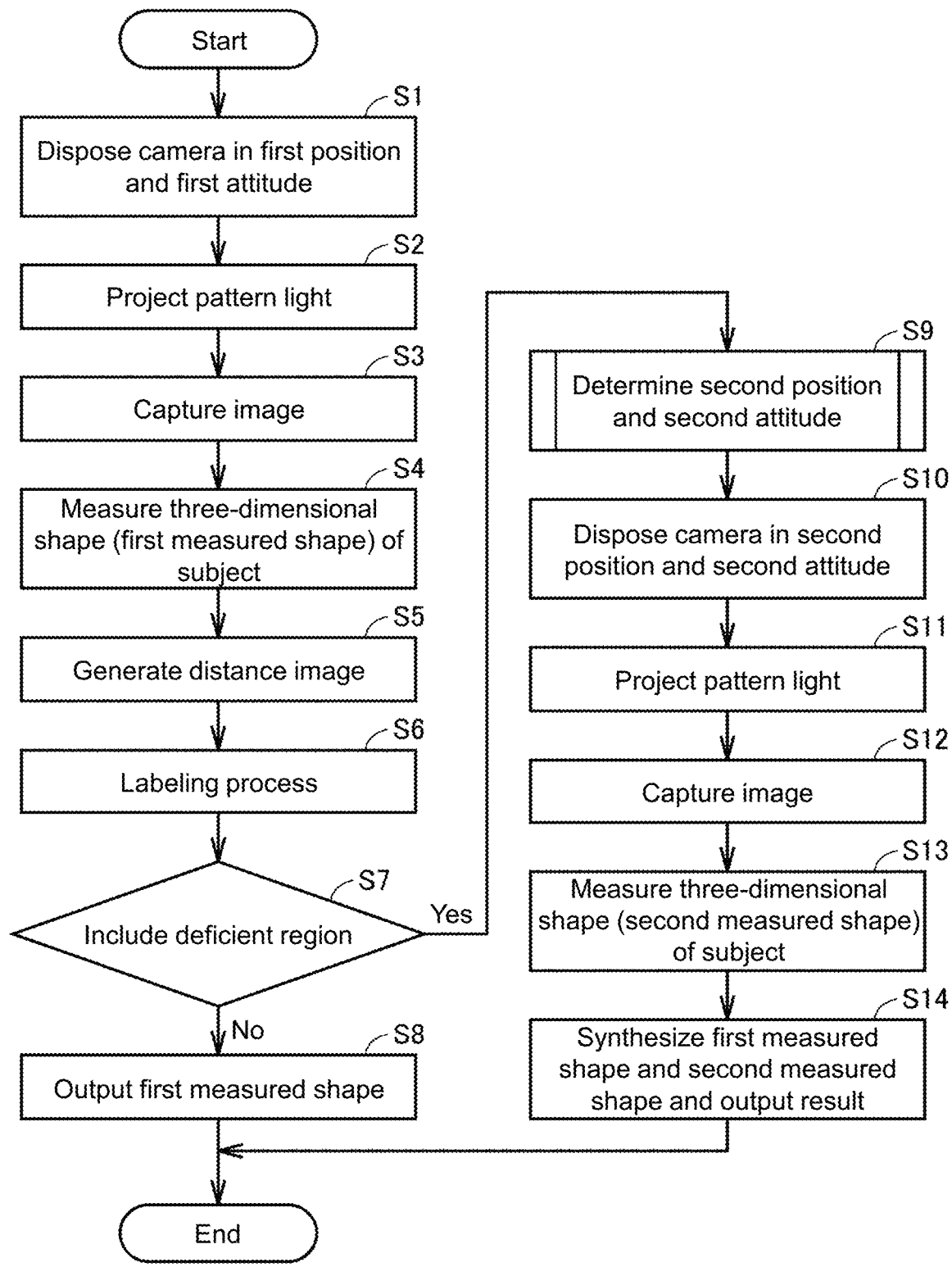
FIG. 9 is a flow chart illustrating an example of a flow of processes of the vision sensor system shown in FIG. 1.

FIG. 9 is a flow chart illustrating an example of a flow of processes of the vision sensor system. First, in step S1, the camera 12 is disposed in the first position and the first attitude. In step S2, the projector 11 projects pattern light onto the subject 101. In step S3, the camera 12 captures an image of the subject 101 onto which the pattern light is projected. In step S4, the measuring unit 30 measures the three-dimensional shape (the first measured shape) of the surface of the subject 101 using an image captured in step S3 (that is, an image captured when the camera 12 is disposed in the first position and the first attitude).

Next, in step S5, the distance image generation unit 53 generates distance image data from three-dimensional shape data representing the first measured shape. In step S6, the labeling unit 54 performs a labeling process on the distance image data. In step S7, it is determined whether a deficient region is included in a distance image indicated by the distance image data. In a case where no deficient region is included in the distance image (NO in step S7), the synthesis unit 40 outputs three-dimensional shape data representing the first measured shape as measurement result data in step S8. After step S8, the vision sensor system 1 ends the process.

In a case where a deficient region is included in the distance image (YES in step S7), the movement destination determination unit 52 determines the second position and the second attitude for capturing an image of the subject 101 again in step S9 on the basis of the first measured shape.

Next, in step S10, the camera 12 is disposed in the second position and the second attitude. In step S11, the projector 11 projects the pattern light onto the subject 101. In step S12, the camera 12 captures an image of the subject 101 onto which the pattern light is projected. In step S13, the measuring unit 30 measures the three-dimensional shape (the second measured shape) of the subject 101 using the image captured in step S10 (that is, an image captured when the camera 12 is disposed in the second position and the second attitude).

Next, in step S14, the synthesis unit 40 synthesizes three-dimensional shape data representing the first measured shape and three-dimensional shape data representing the second measured shape to thereby generate measurement result data, and outputs the generated measurement result data. After step S14, the vision sensor system 1 ends the process.

E. Flow of Processes of Movement Destination Determination Unit

Figure 10:
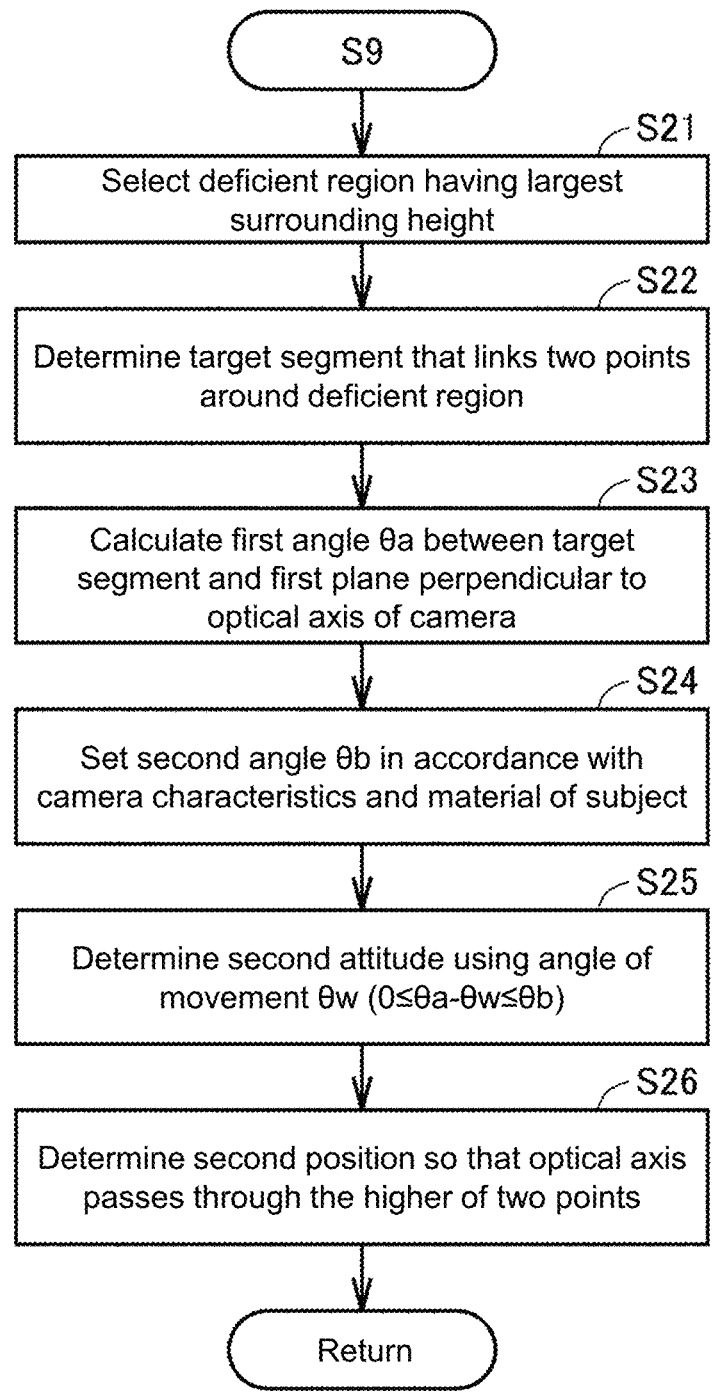
FIG. 10 is a flow chart illustrating a subroutine of a process of determining a second position and a second attitude in FIG. 9.

FIG. 10 is a flow chart illustrating a subroutine of a process of determining the second position and the second attitude (step S9) in FIG. 9.

In step S21, the target segment determination unit 55 selects a deficient region having the largest surrounding height among deficient regions extracted from the distance image. Meanwhile, in a case where the number of deficient regions extracted from the distance image is only one, the target segment determination unit 55 selects the deficient region.

In step S22, the target segment determination unit 55 determines a target segment that links two points around the selected deficient region in the first measured shape. In step S23, the first angle calculation unit 56 calculates the first angle θa between the target segment and the first plane perpendicular to the optical axis of the camera 12 disposed in the first position and the first attitude. In step S24, the second angle setting unit 57 sets the second angle θb in accordance with the characteristics of the camera 12 and the material of the subject 101.

Next, in step S25, the attitude determination unit 58 determines the second attitude of the camera 12 using the angle of movement θw satisfying Expression (1) (0≤θa−θw≤θb). In step S26, the position determination unit 59 determines the second position of the camera 12 so that the optical axis passes through a point having the larger Z coordinate value (that is, a point having the larger height information) out of two points on both ends of the target segment.

F. Operation and Effect

As described above, the movement control unit 50 of the vision sensor system 1 determines the second position and the second attitude for capturing an image of a subject again on the basis of the first measured shape measured by means of the measuring unit 30 using an image captured when the camera 12 is disposed in the first position and the first attitude. The movement control unit 50 sends an instruction for the determined second position and second attitude to the robot 20. The movement control unit 50 extracts the deficient region 60 which is deficient in the Z coordinate value which is height information from the first measured shape. The movement control unit 50 determines the second position and the second attitude on the basis of the Z coordinate values around the deficient region 60 in the first measured shape.

The Z coordinate values around the deficient region 60 have a high possibility of being associated with the three-dimensional shape of the subject 101 within the deficient region 60. Therefore, it is possible to determine the second position and the second attitude that make it easy to acquire Z coordinate values within the deficient region 60 by using the Z coordinate values around the deficient region 60.

The movement control unit 50 determines the second position and the second attitude so that the Z coordinate value of the target segment 64 that links the two points 62 and 63 around the deficient region 60 in the first measured shape can be acquired. The camera 12 is disposed in the second position and the second attitude that make it possible to acquire the Z coordinate value of a target segment 64 that links the point 62 and the point 63, so that there is an increasing possibility of the Z coordinate values within the deficient region 60 being able to be acquired.

The movement control unit 50 obtains the first angle θa between the target segment 64 and the first plane 66 perpendicular to the optical axis 13 of the camera 12 disposed in the first position and the first attitude. The movement control unit 50 determines a difference (θa−θb) between the first angle θa and the second angle θb which is determined in advance in accordance with the characteristics of the camera 12 and the subject 101 as the angle of movement from the first attitude to the second attitude. The movement control unit 50 determines an attitude, rotated by the angle of movement θw from first attitude along the second plane including the target segment 64 and perpendicular to the reference surface 103 in a direction in which an angle between the target segment 64 and the optical axis 13 of the camera 12 approaches 90 degrees, as the second attitude. Thereby, it is possible to minimize the amount of rotational movement from the first attitude to the second attitude that makes it possible to calculate the Z coordinate value of the target segment 64.

The segment obtained by projecting the target segment 64 onto the reference surface 103 is parallel to a direction determined in advance (here, the X-axis direction). Thereby, the target segment determination unit 55 has a tendency to determine the target segment 64.

G. Modification Example 1

In the above description, the target segment determination unit 55 determines the target segment 64 using the reference line 65 that passes through the centroid 61 of the deficient region 60 and is parallel to the X-axis direction (see FIG. 6). However, the method of determining a target segment which is performed by the target segment determination unit 55 is not limited thereto.

Figure 11:
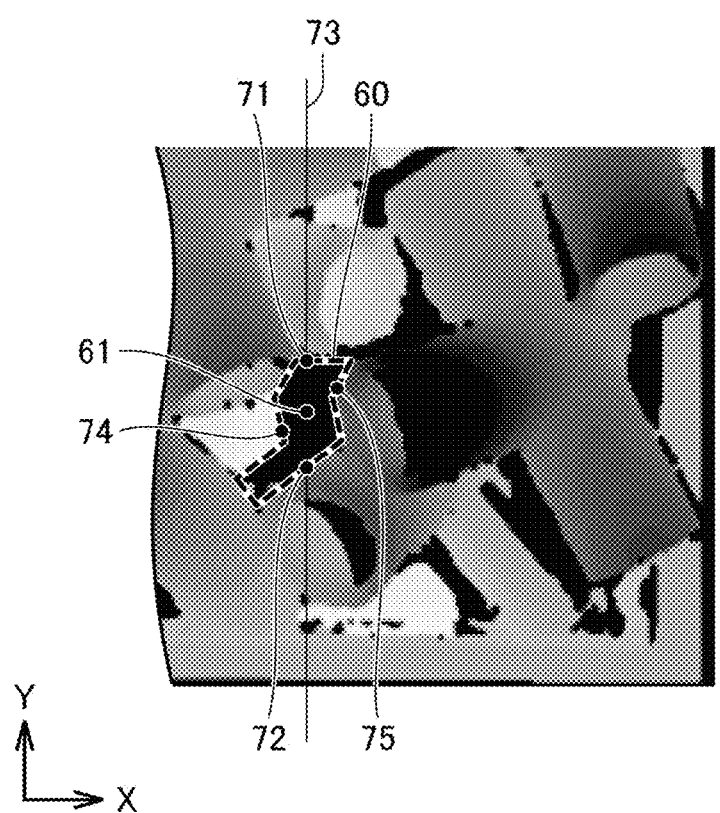
FIG. 11 is a diagram illustrating another example of a method of determining a target segment.

FIG. 11 is a diagram illustrating another example a method of determining a target segment which is performed by the target segment determination unit. As shown in FIG. 11, the target segment determination unit 55 may determine a target segment using a reference line 73 that passes through the centroid 61 of the deficient region 60 and is parallel to a Y-axis direction. The target segment determination unit 55 selects two points 71 and 72 adjacent to the deficient region 60 from points on the reference line 73. The points 71 and 72 are points around the deficient region 60 in the distance image. The target segment determination unit 55 specifies two points of the XYZ coordinate system corresponding to the points 71 and 72 by inversely converting the luminance value into the Z coordinate value, and determines a segment that links the two points as a target segment. Since the reference line 73 is parallel to the Y-axis direction, the segment obtained by projecting the target segment 64 onto the reference surface 103 is parallel to the Y-axis direction.

In this case, the attitude determination unit 58 determines the second attitude by rotationally moving the camera 12 along a second plane including a target segment and perpendicular to the reference surface 103 (that is, the XY plane) (that is, a plane parallel to a YZ plane). Specifically, the attitude determination unit 58 determines an attitude, rotated by the angle of movement θw from the first attitude along the second plane (the plane parallel to the YZ plane) in a direction in which an angle between the target segment and the optical axis of the camera 12 approaches 90 degrees, as the second attitude.

Alternatively, the target segment determination unit 55 may select a point 74 having a maximum luminance value (that is, a point having a maximum Z coordinate value) and a point 75 having a minimum luminance value (that is, a point having a minimum Z coordinate value) among points around the deficient region 60 in the distance image. The target segment determination unit 55 specifies two points of the XYZ coordinate system corresponding to the points 74 and 75 by inversely converting the luminance value into the Z coordinate value, and determines a segment that links the two points as a target segment. The two points are a point having a maximum Z coordinate value (height information) and a point having a minimum Z coordinate value among points around the deficient region 60 in the first measured shape.

Thereby, the target segment determination unit 55 can determine a target segment having a largest first angle θa with respect to the first plane 66 (see FIG. 7) perpendicular to the optical axis 13 of the camera 12 disposed in the first position and the first attitude. As a result, the camera 12 is disposed in the second position and the second attitude, so that there is an increasing possibility of the Z coordinate value of the deficient region 60 being able to be calculated.

H. Modification Example 2

In the above description, the position determination unit 59 determines the second position of the camera 12 so that the optical axis passes through a point having the larger Z coordinate value out of the points 62 and 63 on both ends of the target segment 64. However, the position determination unit 59 may determine the second position of the camera 12 so that the optical axis passes through a point having the smaller Z coordinate value (that is, a point having the smaller height information) out of the points 62 and 63 on both ends of the target segment 64. Alternatively, the position determination unit 59 may determine the second position of the camera 12 so that the optical axis passes through the midpoint of the points 62 and 63 on both ends of the target segment 64.

I. Modification Example 3

The second angle setting unit 57 may set an angle (θmax-θα) smaller by a margin angle θα determined in advance from the angle θmax as the second angle θb. Thereby, when the camera 12 is disposed in the second position and the second attitude, an angle between a plane perpendicular to the optical axis of the camera 12 and the target segment 64 becomes smaller than the angle θmax by the margin angle θα or more. As a result, there is a tendency to calculate the Z coordinate value of the deficient region 60.

J. Modification Example 4

In the above description, the second position and the second attitude are determined so that the Z coordinate value of the target segment 64 that links two points around the deficient region 60 in the first measured shape can be calculated. However, the second position and the second attitude may be determined so that the Z coordinate value of a target region overlapping a deficient region in an approximate plane approximating at least three points around the deficient region 60 in the first measured shape instead of the target segment can be calculated.

Figure 12:
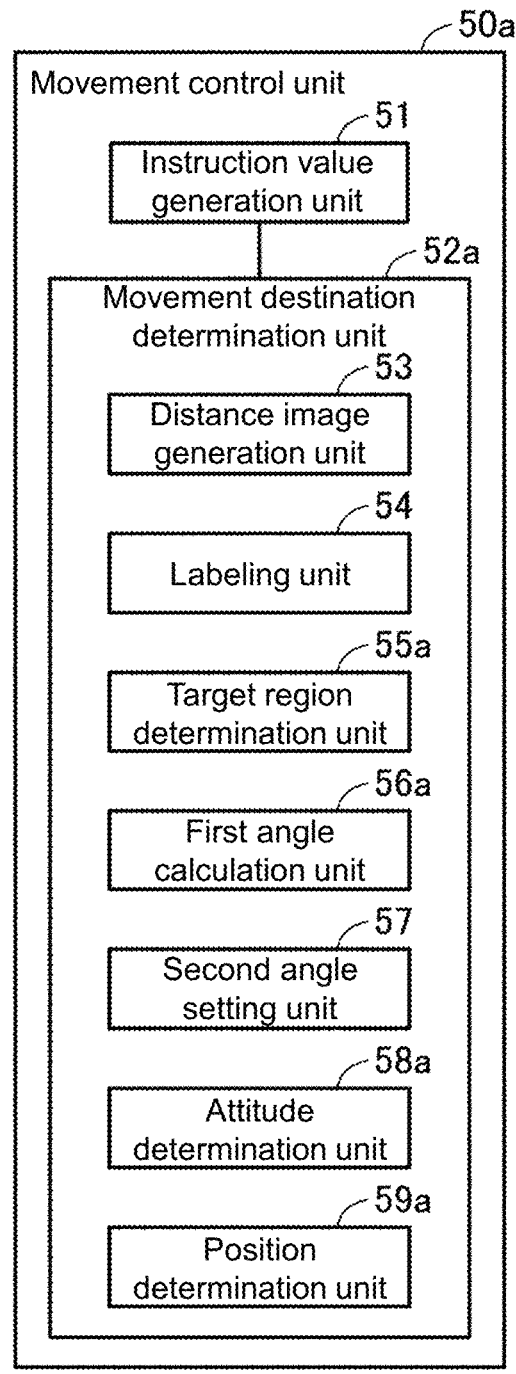
FIG. 12 is a block diagram illustrating an internal configuration of a movement control unit according to modification example 4.
Figure 13:
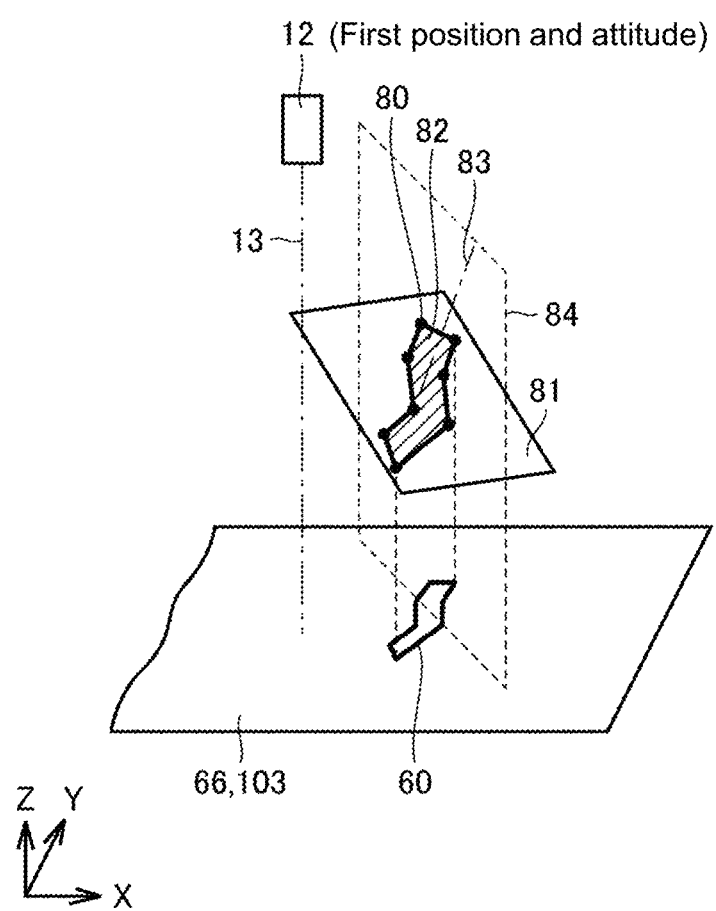
FIG. 13 is a diagram illustrating an example of a target region.

A vision sensor system according to modification example 4 will be described with reference to FIGS. 12 and 13. FIG. 12 is a block diagram illustrating an internal configuration of a movement control unit according to modification example 4. FIG. 13 is a diagram illustrating an example of a target region.

As shown in FIG. 12, the vision sensor system according to modification example 4 is different from the vision sensor system 1 shown in FIG. 1, in that a movement control unit 50a shown in FIG. 11 is included instead of the movement control unit 50 shown in FIG. 5. The movement destination determination unit 52a of the movement control unit 50a is different from the movement destination determination unit 52 of the movement control unit 50, in that a target region determination unit 55a, a first angle calculation unit 56a, an attitude determination unit 58a and a position determination unit 59a are included instead of the target segment determination unit 55, the first angle calculation unit 56, the attitude determination unit 58 and the position determination unit 59.

As shown in FIG. 13, the target region determination unit 55a specifies an approximate plane 81 approximating at least three points 80 around the deficient region 60 in the first measured shape. The target region determination unit 55a determines a region overlapping the deficient region 60 in the approximate plane 81 as a target region 82.

The first angle calculation unit 56a calculates an angle between the target region 82 and the first plane 66 perpendicular to the optical axis 13 of the camera 12 disposed in the first position and the first attitude as the first angle θa.

The attitude determination unit 58a determines the second attitude so that the Z coordinate value of the target region 82 can be calculated. Specifically, similarly to the attitude determination unit 58, the attitude determination unit 58a determines θw satisfying Expression (1) as the angle of movement θw from the first attitude to the second attitude. For example, the attitude determination unit 58a determines a difference (θa-θb) between the first angle θa and the second angle θb as the angle of movement θw. Thereby, it is possible to minimize the amount of movement from the first attitude to the second attitude.

The attitude determination unit 58a determines the second attitude by rotationally moving the first attitude along a second plane 84 including a normal line 83 of the target region 82 and perpendicular to the reference surface 103 (that is, the XY plane). Specifically, the attitude determination unit 58a determines an attitude, rotated by the angle of movement θw from the first attitude along the second plane 84 in a direction in which an angle between the target region 82 and the optical axis 13 of the camera 12 approaches 90 degrees, as the second attitude.

The position determination unit 59a determines the second position so that the Z coordinate value of the target region 82 can be calculated. Specifically, the position determination unit 59a determines the position of the camera 12 satisfying the following conditions a' and b' as the second position.

Condition a': In the second attitude determined by means of the attitude determination unit 58a, the optical axis 13 of the camera 12 passes through a point within the target region 82 (for example, the centroid of the target region 82).

Condition b': a distance from a point within the target region 82 (for example, the centroid of a target region) to the first position and a distance from the point to the second position are equal to each other.

As stated above, the second position and the second attitude are determined so that the Z coordinate value of the target region 82 can be calculated. The camera 12 is disposed in the second position and the second attitude that make it possible to calculate the Z coordinate value of the target region 82, so that there is an increasing possibility of the Z coordinate values within the deficient region 60 being able to be calculated.

K. Other Modification Examples

The movement control unit 50 may rotate the acquisition unit 10 around the optical axis of the camera 12.

Figure 14:
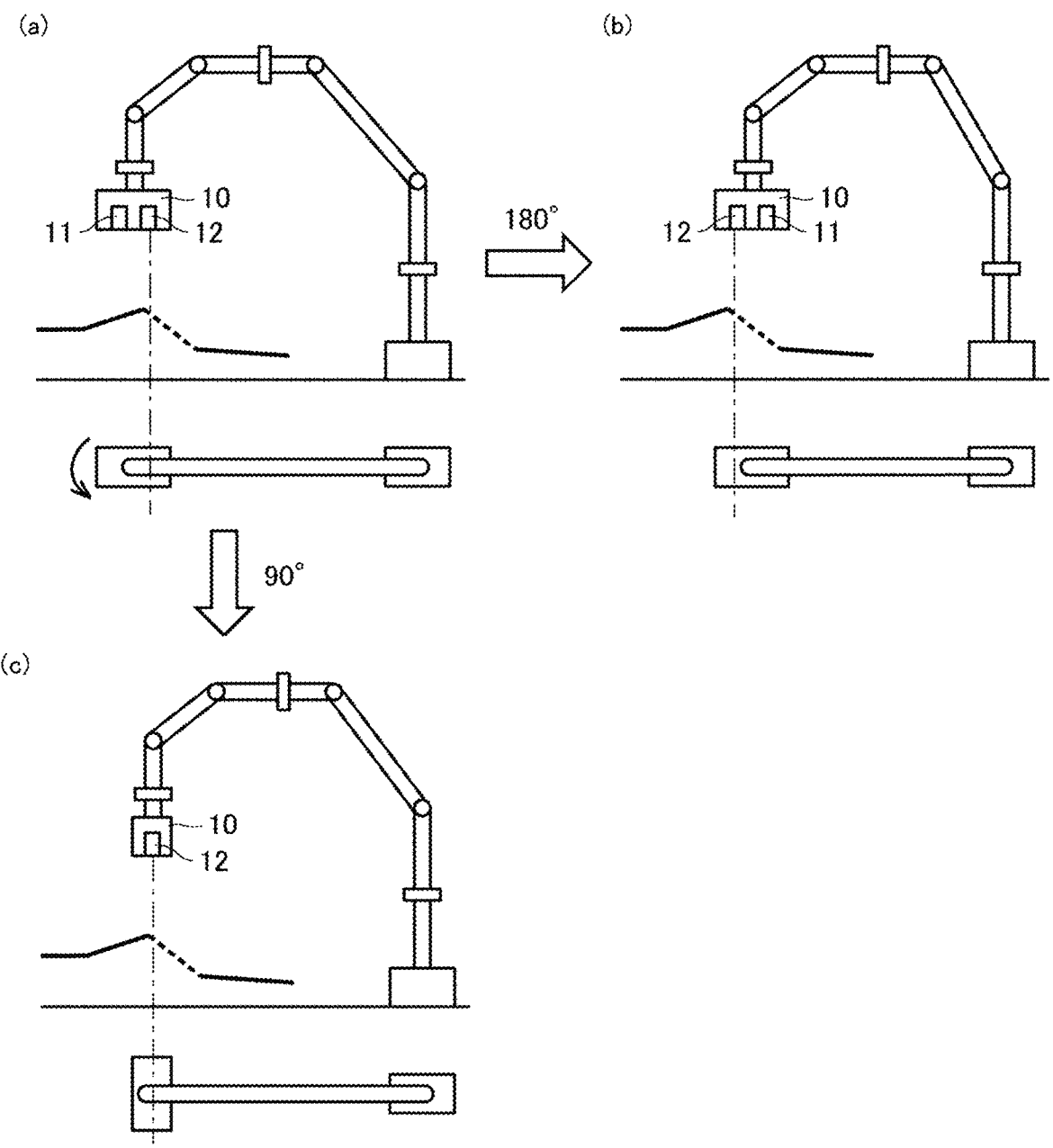
FIG. 14 is a diagram illustrating an example of a rotational position of an acquisition unit.

FIG. 14 is a diagram illustrating an example of the rotational position of the acquisition unit 10. In (*a*) to (*c*) of FIG. 14, the upper part shows a side view, and the lower part shows a plan view. For example, as shown in (*b*) of FIG. 14, the movement control unit 50 rotates the acquisition unit 180° around the optical axis 13 of the camera 12. Alternatively, as shown in (c) of FIG. 14, the movement control unit 50 may rotate the acquisition unit 90° around the optical axis 13 of the camera 12. Thereby, it is possible to change the incident direction of the pattern light from the projector 11.

Addition

As will be stated below, the present embodiment includes the following disclosures.

Configuration 1

A vision sensor system (1) including:
an image capturing unit (12) that captures an image of a subject (101);
a movement mechanism (20) that disposes the image capturing unit (12) in an instructed position with an instructed attitude;
a measuring unit (30) that measures a three-dimensional shape of a surface of the subject (101) using an image captured by the image capturing unit (12); and
a movement control unit (50) that determines a second position and a second attitude for capturing an image of the subject (101) again on the basis of a measured shape which is a three-dimensional shape of the subject (101) measured by means of the measuring unit (30) using an image captured when the image capturing unit (12) is disposed in a first position and a first attitude, and sends an instruction to the movement mechanism (20),
wherein the three-dimensional shape is represented by means of height information from a reference surface (103), and
the movement control unit (50)
extracts a deficient region (60) which is deficient in the height information from the measured shape, and
determines the second position and the second attitude on the basis of the height information around the deficient region (60) in the measured shape.

Configuration 2

The vision sensor system (1) according to configuration 1, wherein the movement control unit (50) determines the second position and the second attitude so that height information of a target segment (64) that links two points around the deficient region (60) in the measured shape is able to be acquired.

Configuration 3

The vision sensor system (1) according to configuration 2, wherein the movement control unit (50)
obtains a first angle between the target segment (64) and a first plane (66) perpendicular to an optical axis of the image capturing unit (12) disposed in the first position and the first attitude,
determines a difference between the first angle and a second angle which is determined in advance in accordance with characteristics of the image capturing unit (12) and the subject (101) as an angle of movement from the first attitude to the second attitude, and
determines an attitude, rotated by the angle of movement from the first attitude along a second plane including the target segment (64) and perpendicular to the reference surface (103) in a direction in which an angle between the target segment (64) and the optical axis of the image capturing unit (12) approaches 90 degrees, as the second attitude.

Configuration 4

The vision sensor system (1) according to configuration 3, wherein a segment obtained by projecting the target segment (64) onto the reference surface (103) is parallel to a direction determined in advance.

Configuration 5

The vision sensor system (1) according to configuration 2 or 3, wherein, in the measured shape, one of the two points is a point at which the height information is maximum around the deficient region (60), and the other of the two points is a point at which the height information is minimum around the deficient region (60).

Configuration 6

The vision sensor system (1) according to configuration 2, wherein the movement control unit (50) determines the second position and the second attitude so that height information of a target region (82) overlapping the deficient region (60) in an approximate plane (81) approximating at least three points around the deficient region (60) in the measured shape is able to be acquired.

Configuration 7

The vision sensor system (1) according to configuration 6, wherein the movement control unit (50)
obtains a first angle between the target region (82) and a first plane (66) perpendicular to an optical axis of the image capturing unit (12) disposed in the first position and the first attitude,
determines a difference between the first angle and a second angle which is determined in advance in accordance with characteristics of the image capturing unit (12) and the subject (101) as an angle of movement from the first attitude to the second attitude, and
determines an attitude, rotated by the angle of movement from the first attitude along a second plane (84) including a normal line (83) of the target region (82) and perpendicular to the reference surface (103) in a direction in which an angle between the target region (82) and the optical axis of the image capturing unit (12) approaches 90 degrees, as the second attitude.

Configuration 8

The vision sensor system (1) according to any one of configurations 2 to 5, wherein the movement control unit (50) determines the second position so that an optical axis of the image capturing unit (12) passes through a reference point which is a point having the larger height information out of the two points.

Configuration 9

The vision sensor system (1) according to any one of configurations 2 to 5, wherein the movement control unit (50) determines the second position so that an optical axis of the image capturing unit (12) passes through a reference point which is a point having the smaller height information out of the two points.

Configuration 10

The vision sensor system (1) according to any one of configurations 2 to 5, wherein the movement control unit (50) determines the second position so that an optical axis of the image capturing unit (12) passes through a reference point which is a midpoint between the two points.

Configuration 11

The vision sensor system (1) according to configuration 6 or 7, wherein the movement control unit (50) determines the second position so that an optical axis of the image capturing unit (12) passes through a reference point within the target region.

Configuration 12

The vision sensor system (1) according to any one of configurations 8 to 11, wherein the movement control unit (50) determines the second position so that a distance between the reference point and the first position and a distance between the reference point and the second position become equal to each other.

Configuration 13

A control method of controlling a vision sensor system (1) provided with
an image capturing unit (12) that captures an image of a subject (101),
a movement mechanism (20) that disposes the image capturing unit (12) in an instructed position with an instructed attitude, and
a measuring unit (30) that measures a three-dimensional shape of a surface of the subject (101) using an image captured by the image capturing unit (12),
wherein the three-dimensional shape is represented by means of height information from a reference surface (103), and
the control method includes:
a step of extracting a deficient region (60) which is deficient in the height information from a measured shape which is a three-dimensional shape of the subject (101) measured by means of the measuring unit (30) using an image captured when the image capturing unit (12) is disposed in a first position and a first attitude; and
a step of determining a second position and a second attitude for capturing an image of the subject (101) again on the basis of the height information around the deficient region (60) in the measured shape.

Configuration 14

A program (507) for supporting a vision sensor system (1) provided with
an image capturing unit (12) that captures an image of a subject (101),
a movement mechanism (20) that disposes the image capturing unit (12) in an instructed position with an instructed attitude, and a measuring unit (30) that measures a three-dimensional shape of a surface of the subject (101) using an image captured by the image capturing unit (12),
wherein the three-dimensional shape is represented by means of height information from a reference surface (103), and
the program causes a computer to execute:
a step of extracting a deficient region (60) which is deficient in the height information from a measured shape which is a three-dimensional shape of the subject (101) measured by means of the measuring unit (30) using an image captured when the image capturing unit (12) is disposed in a first position and a first attitude; and
a step of determining a second position and a second attitude for capturing an image of the subject (101) again on the basis of the height information around the deficient region (60) in the measured shape.

Although an embodiment of the present invention has been described, it is noted that the embodiment disclosed herein is merely illustrative in all aspects and should not be recognized as being restrictive. The scope of the present invention is defined by the scope, and is intended to include meanings equivalent to the scope of claims and all modifications within the scope.

The invention claimed is:

1. A vision sensor system comprising:
a camera that captures an image of a subject;
a movement mechanism that disposes the camera in an instructed position with an instructed attitude;
a first processor that measures a three-dimensional shape of a surface of the subject using an image captured by the camera; and
a second processor that determines a second position and a second attitude for capturing an image of the subject again on the basis of a measured shape which is a three-dimensional shape of the subject measured by means of the first processor using an image captured when the camera is disposed in a first position and a first attitude, and sends an instruction to the movement mechanism,
wherein the three-dimensional shape is represented by means of height information from a reference surface, and
the second processor
extracts a deficient region which is deficient in the height information from the measured shape, and
determines the second position and the second attitude on the basis of the height information around the deficient region in the measured shape,
wherein the second processor determines the second position and the second attitude so that height information of a target segment that links two points around the deficient region in the measured shape is able to be acquired.

2. The vision sensor system according to claim 1, wherein the second processor
obtains a first angle between the target segment and a first plane perpendicular to an optical axis of the camera disposed in the first position and the first attitude,
determines a difference between the first angle and a second angle which is determined in advance in accordance with characteristics of the camera and the subject as an angle of movement from the first attitude to the second attitude, and
determines an attitude, rotated by the angle of movement from the first attitude along a second plane including the target segment and perpendicular to the reference surface in a direction in which an angle between the target segment and the optical axis of the camera approaches 90 degrees, as the second attitude.

3. The vision sensor system according to claim 2, wherein a segment obtained by projecting the target segment onto the reference surface is parallel to a direction determined in advance.

4. The vision sensor system according to claim 2, wherein, in the measured shape, one of the two points is a point at which the height information is maximum around the deficient region, and the other of the two points is a point at which the height information is minimum around the deficient region.

5. The vision sensor system according to claim 2, wherein the second processor determines the second position so that an optical axis of the camera passes through a reference point which is a point having the larger height information out of the two points.

6. The vision sensor system according claim 2, wherein the second processor determines the second position so that an optical axis of the camera passes through a reference point which is a point having the smaller height information out of the two points.

7. The vision sensor system according to claim 2, wherein the second processor determines the second position so that an optical axis of the camera passes through a reference point which is a midpoint between the two points.

8. The vision sensor system according to claim 1, wherein, in the measured shape, one of the two points is a point at which the height information is maximum around the deficient region, and the other of the two points is a point at which the height information is minimum around the deficient region.

9. The vision sensor system according to claim 1, wherein the second processor determines the second position and the second attitude so that height information of a target region overlapping the deficient region in an approximate plane approximating at least three points around the deficient region in the measured shape is able to be acquired.

10. The vision sensor system according to claim 9, wherein the second processor
obtains a first angle between the target region and a first plane perpendicular to an optical axis of the camera disposed in the first position and the first attitude,
determines a difference between the first angle and a second angle which is determined in advance in accordance with characteristics of the camera and the subject as an angle of movement from the first attitude to the second attitude, and
determines an attitude, rotated by the angle of movement from the first attitude along a second plane including a normal line of the target region and perpendicular to the reference surface in a direction in which an angle between the target region and the optical axis of the camera approaches 90 degrees, as the second attitude.

11. The vision sensor system according to claim 10, wherein the second processor determines the second position so that an optical axis of the camera passes through a reference point within the target region.

12. The vision sensor system according to claim 9, wherein the second processor determines the second position so that an optical axis of the camera passes through a reference point within the target region.

13. The vision sensor system according to claim 1, wherein the second processor determines the second position so that an optical axis of the camera passes through a reference point which is a point having the larger height information out of the two points.

14. The vision sensor system according to claim 13, wherein the second processor determines the second position so that a distance between the reference point and the first position and a distance between the reference point and the second position become equal to each other.

15. The vision sensor system according claim 1, wherein the second processor determines the second position so that an optical axis of the camera passes through a reference point which is a point having the smaller height information out of the two points.

16. The vision sensor system according to claim 15, wherein the second processor determines the second position so that a distance between the reference point and the first position and a distance between the reference point and the second position become equal to each other.

17. The vision sensor system according to claim 1, wherein the second processor determines the second position so that an optical axis of the camera passes through a reference point which is a midpoint between the two points.

18. A control method of controlling a vision sensor system provided with
an image capturing unit that captures an image of a subject,
a movement mechanism that disposes the image capturing unit in an instructed position with an instructed attitude, and
a measuring unit that measures a three-dimensional shape of a surface of the subject using an image captured by the image capturing unit,
wherein the three-dimensional shape is represented by means of height information from a reference surface, and
the control method comprises:
a step of extracting a deficient region which is deficient in the height information from a measured shape which is a three-dimensional shape of the subject measured by means of the measuring unit using an image captured when the image capturing unit is disposed in a first position and a first attitude; and
a step of determining a second position and a second attitude for capturing an image of the subject again on the basis of the height information around the deficient region in the measured shape,
wherein the step of determining the second position and the second attitude for capturing the image of the subject again on the basis of the height information around the deficient region in the measured shape comprises:
determining the second position and the second attitude so that height information of a target segment that links two points around the deficient region in the measured shape is able to be acquired.

19. A non-transitory computer readable storage medium storing a program for supporting a vision sensor system provided with
an image capturing unit that captures an image of a subject,
a movement mechanism that disposes the image capturing unit in an instructed position with an instructed attitude, and
a measuring unit that measures a three-dimensional shape of a surface of the subject using an image captured by the image capturing unit, wherein the three-dimensional shape is represented by means of height information from a reference surface, and the program causes a computer to execute:

a step of extracting a deficient region which is deficient in the height information from a measured shape which is a three-dimensional shape of the subject measured by means of the measuring unit using an image captured when the image capturing unit is disposed in a first position and a first attitude; and a step of determining a second position and a second attitude for capturing an image of the subject again on the basis of the height information around the deficient region in the measured shape, wherein the step of determining the second position and the second attitude for capturing the image of the subject again on the basis of the height information around the deficient region in the measured shape comprises:

determining the second position and the second attitude so that height information of a target segment that links two points around the deficient region in the measured shape is able to be acquired.

* * * * *